United States Patent [19]

McCarroll

[11] Patent Number: 4,488,889
[45] Date of Patent: Dec. 18, 1984

[54] AIR CLEANER TANK

[76] Inventor: Glenn G. McCarroll, c/o Alcolite Products Corporation, 319 Industrial Pkwy., Harbor Beach, Mich. 48441

[21] Appl. No.: 472,697
[22] Filed: Mar. 7, 1983
[51] Int. Cl.³ .............................................. B01D 46/02
[52] U.S. Cl. ....................................... 55/502; 55/507; 55/510
[58] Field of Search ................. 55/493, 495, 502, 505, 55/507, 509, 510, 504, DIG. 28, 503

[56] References Cited

U.S. PATENT DOCUMENTS

| 2,273,210 | 2/1942 | Lowther et al. | 55/505 X |
| 3,201,927 | 8/1965 | Wachter | 55/510 X |
| 3,261,146 | 7/1966 | Malec | 55/510 X |
| 3,269,097 | 8/1966 | Yerman | 55/510 X |
| 4,312,651 | 1/1982 | Esaki et al. | 55/502 |
| 4,322,230 | 3/1982 | Schoen | 55/502 X |
| 4,438,960 | 3/1984 | Carroll et al. | 285/367 |

Primary Examiner—Charles Hart
Attorney, Agent, or Firm—Cullen, Sloman, Cantor, Grauer, Scott & Rutherford

[57] ABSTRACT

A housing for an air filter having a detachable cover and base plate on opposite ends. The cover and base plate are secured to the housing by means of a clamping ring which is provided with a sealing gasket and/or O-ring for perfecting a seal therebetween. The cover includes a receptacle for receiving an inlet duct which is secured to the cover by a clamping ring. The housing includes a receptacle for an outlet duct which is secured to the housing by a clamping ring. An air filter is disposed within the housing to form an inlet plenum and an outlet plenum which facilitate airflow through the filter element. The cover includes a collar for securely locating the air filter element within the housing.

4 Claims, 7 Drawing Figures

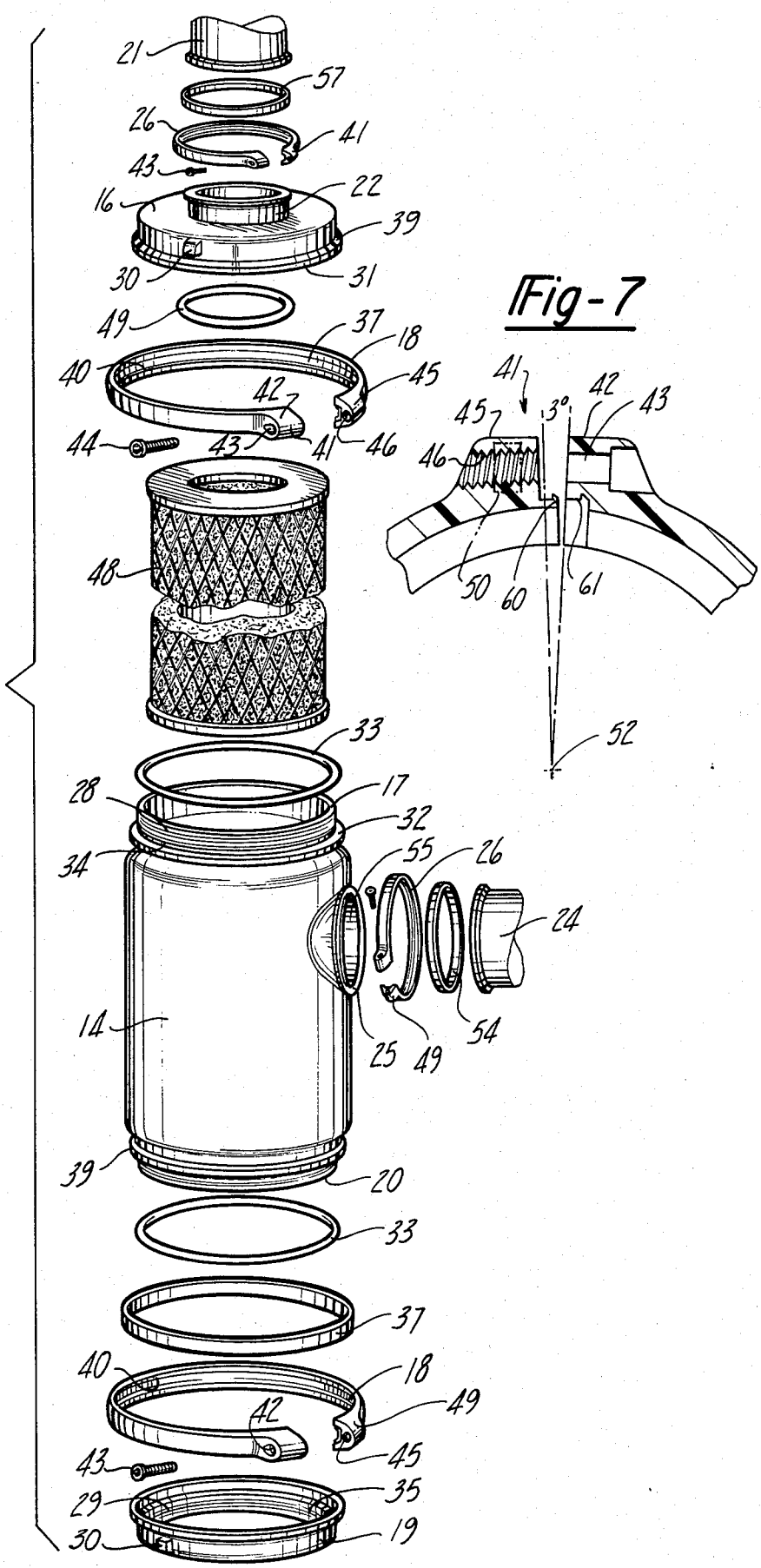

AIR CLEANER TANK

BACKGROUND OF THE INVENTION

1. TECHNICAL FIELD

The present invention relates to an air cleaner tank for enclosing an air filter. In particular, the invention relates to a high efficiency truck air cleaner tank.

2. PRIOR ART

An air cleaner tank is an airtight housing for a replaceable filter element. Air enters the housing and passes through the filter element before leaving the housing through an outlet which supplies air to the engine. Conventional air cleaner tanks are cylindrical metal tanks having a cylindrical air filter element. The engine draws air through the air cleaner tank by creating a high vacuum at the tank outlet. The air filter element removes solid contaminants from the engine supply air to prevent damage to the engine. Unfiltered air may reach the engine if the air cleaner tank is not airtight or if air entering the tank through the inlet duct is permitted to circumvent the filter element.

Air cleaner tanks currently in use on trucks have metal housings with one removable end for periodic replacement of the air filter element. The removable end of the air cleaner tank must be attached to the housing so as to form an airtight seal. In prior art air cleaner tanks the non-removable end of the tank is sealed by welding and the removable end (usually at the top) is secured by welded studs on the housing. Leakage is prevented by providing a gasket between the top cover and the housing and by bolting the cover to the housing with four to eight bolts that are carefully tightened according to torque specifications. Improper installation of the tank cover frequently results in cover warpage and leakage about the top of the housing. If air is permitted to leak into the housing about the cover it can then flow directly to the engine without passing through the air filter element.

Another problem with prior art cleaners is that the air filter element can be improperly located within the housing, permitting air to circumvent the air filter element. The high vacuum developed at the outlet of the tank could cause the air filter element to be pulled towards the outlet and reduce the efficiency of the air filter element by only using a limited portion of the element. Similarly, vibration or shocks can cause the air filter element to be shifted out of its optimum operating position.

In the prior art air cleaner tanks the base is not removable from the housing, which necessitates removal of the cover to replace the air filter element. Replacement of an air filter element is complicated by the need to remove or bend the duct which was attached to the cover before removing the cover from the top of the housing. If the air cleaner duct is the rigid type of duct it must be removed prior to disassembly of the cover from the housing. If the duct is flexible it can be twisted when the cover is removed from the housing, but this causes wear and tear on the duct.

When tightening the cover onto the housing great care must be exercised in securing the bolts so that the cover is not warped and the gasket is not damaged during installation. Damage to the cover or gasket is difficult to check in prior art systems, and once the cover is secured to the housing it is seldom checked for adequacy of the seal.

Prior art air cleaner tanks are heavy metal structures that must be strong to resist denting from foreign objects impacting the exterior. The cover and housing must also be strong enough to prevent distortion when the cover is bolted to the housing. Since the air cleaner tank is normally mounted exteriorly of the truck it must resist denting and corrosion. If a truck is involved in a minor accident or is hit on the air cleaner tank by a stone it can become dented which could make replacement of the filter element difficult and the creation of a complete seal impossible.

SUMMARY OF THE INVENTION

According to the present invention an improved air cleaner tank system is provided in which the tank housing has a removable cover and base plate which are secured to the housing by means of integrally formed screw threads and clamping rings. The cover and base plate include elastomeric seal members which simply and effectively seal the entire housing. The clamping rings are designed to prevent latching of the ring unless the housing and cover or base plate are properly aligned to form a tight seal. Since both ends of the air cleaner tank are removable, the air filter element may be replaced by removing either the cover or the base plate, whichever is more convenient.

The cover of the air cleaner tank includes a collar which extends inside one end of a conventional cylindrical air filter element to properly locate the element within the housing. Accurate location of the air filter element in the housing assures a good seal between the air filter element and the inner walls of the housing. By locating the air filter element centrally within the housing the whole element is used for air filtering purposes because air may pass from a central plenum inside the air filter element to an exterior plenum formed between the air filter element and the housing walls. As a result air filter element life may be extended and leakage about the air filter element can be effectively prevented by providing elastomeric sealing elements between the collar and the filter element.

The entire housing assembly, including the cover, base plate and clamping rings, is formed of a thermoplastic material having high strength characteristics. The air cleaner tank is superior to prior art air cleaner tanks because it is lightweight, resists denting and is not subject to corrosion. The air cleaner tank is both attractive and inexpensive to manufacture in comparison to prior art air cleaner tanks.

BRIEF DESCRIPTION OF THE DRAWINGS

FIG. 6 is an exploded perspective view of the air cleaner tank of the present invention.

FIG. 7 is an enlarged fragmentary cross-sectional view showing the ring latch.

DETAILED DESCRIPTION OF THE INVENTION

Figure 1:
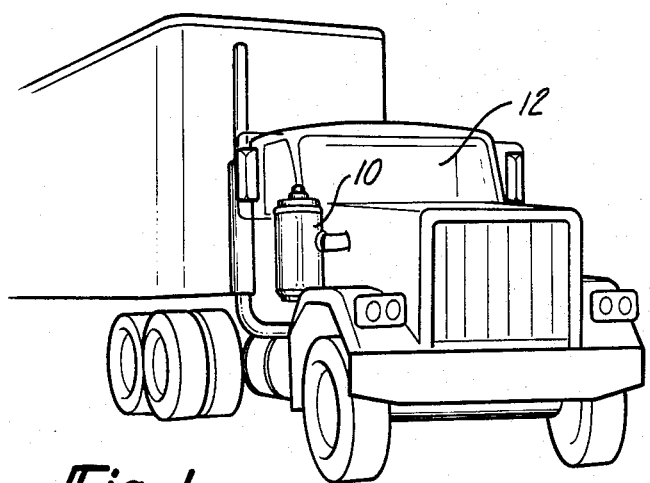
FIG. 1 is a perspective view of a truck having the air cleaner tank of the present invention.

Referring now to the drawings, FIG. 1 shows the air cleaner tank 10 of the present invention installed on a truck 12.

Figure 2:
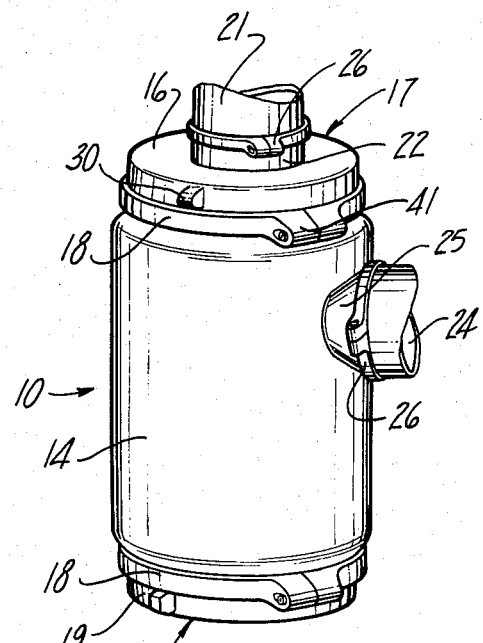
FIG. 2 is a perspective view of the air cleaner tank of the present invention shown attached to an inlet duct and an outlet duct.
Figure 3:
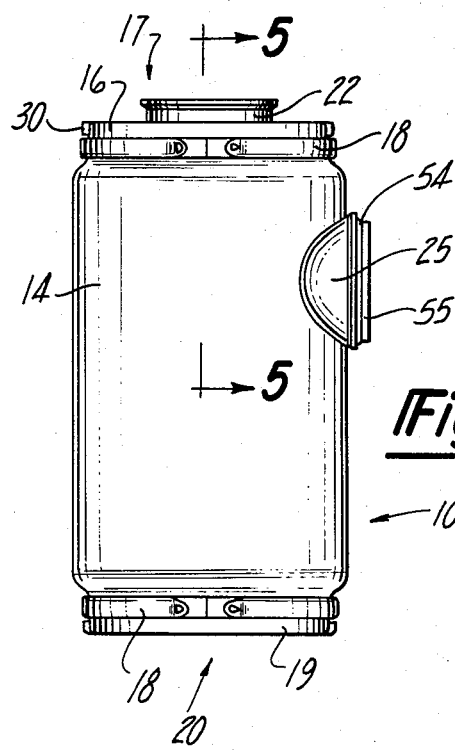
FIG. 3 is a side elevational view of the air cleaner tank.

As shown in FIGS. 2, 3 and 6, the air cleaner tank 10 includes a one piece open ended cylindrical housing 14 having a cover 16 attached to its top end 17 by means of a clamping ring 18. A base plate 19 is securely fastened to the bottom end 20 of the housing 14 by means of another clamping ring 18.

An air inlet duct 21 is attached to the cover 16 at an inlet duct receptacle 22 located in the center of the cover 16. An outlet duct 24 is attached to an outlet duct receptacle formed in the side of the housing 14. The inlet duct 21 and outlet duct 24 are secured to the inlet duct receptacle 22 and outlet duct receptacle 25 by duct clamping rings 26.

Figure 4:
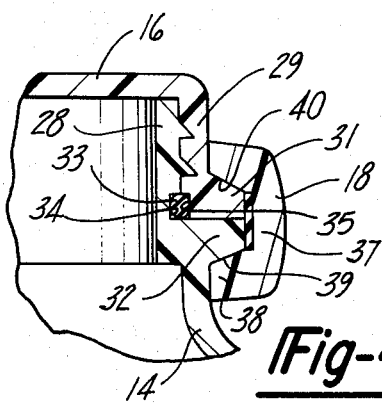
FIG. 4 is an enlarged fragmentary cross-sectional view showing the cover secured to the housing by means of the clamping ring.
Figure 5:
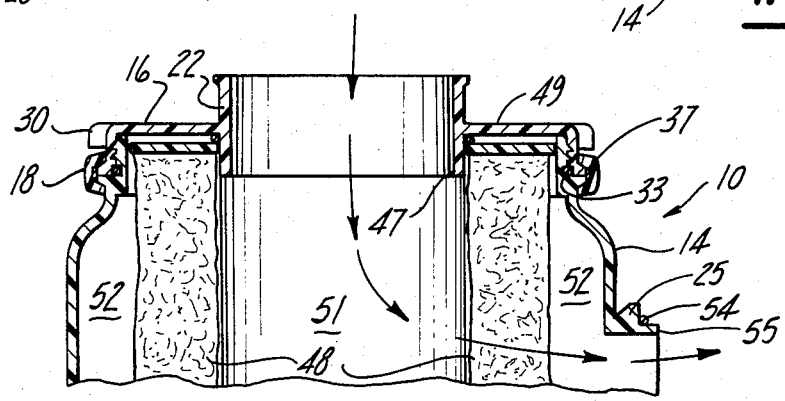
FIG. 5 is fragmentary cross-sectional view of the housing showing the top portion of the housing and the cover with the air filter element disposed within the housing.

The cover 16 and base plate 19 are secured to the top and bottom ends 17 and 20 of the housing 14 by the arrangement shown in FIGS. 4 and 5. FIG. 4 will be described with reference to the cover 16 being secured to the housing 14 but it is to be understood that the base plate 19 is secured to the opposite end of the housing 14 in a similar fashion. The top end 17 of the housing 14 is provided with an externally threaded end 28 which is adapted to receive the internally threaded portion 29 of the cover 16. Lugs 30 are provided on the cover 16 for turning the cover relative to the housing by means of a specially designed wrench (not shown) to permit tightening and loosening of the cover. The cover 16 is tightened onto the housing 14 until the cover flange 31 abuts the housing end flange 32. The O-ring 33 is provided to assure a seal between the cover 16 and the housing 14 to prevent air from leaking into the air cleaner tank. The O-ring 33 is disposed within a housing O-ring groove 34 and a cover O-ring groove 35 which are aligned with one another when the cover flange 31 abuts the housing end flange 32.

To further assure an adequate seal between the housing 14 and cover 16 a ring seal 37 may be provided within the clamping ring 18 between ring legs 38. Ring legs 38 are formed on the upper and lower portions of the clamping ring 18 and are effective to clamp the cover flange 31 to the housing end flange 32. A tapered surface 39 is formed on the top surface of the cover flange 31 and the bottom surface of the housing end flange 32. The tapered surfaces 39 are radially outwardly converging and form a tapezoidal cross-section when the cover flange 31 and housing end flange 32 are abutted together. The ring legs 38 include radially inwardly diverging chamfered surfaces 40 on their interior portions which are adapted to engage the tapered surfaces 39 of the cover flange 31 and housing end flange 32. The chamfered surfaces 40 of the ring legs 38 bear upon the tapered surfaces 39 of the cover flange 31 and housing end flange 32 to lock the cover 16 onto the housing 14 when the clamping ring 18 is secured in place. If the cover 16 is not properly seated on the housing 14, the clamping ring 18 will be held radially outward by the tapered surface 39. The clamping ring 18 will not be permitted to close completely and will thereby indicate improper assembly.

The clamping ring 18 is a split ring member that is spread to expand over the outer diameter of the cover flange 31 and the housing end flange 32. The clamping ring 18 is split to form two circumferentially adjacent ends and is secured to the air cleaner tank 10 by means of a two part ring latch 41 (see FIGS. 6 and 7). The ring latch 41 includes a first part 42 on one end formed by the split in the clamping ring 18 having a clearance hole 43 for receiving a bolt 44 therethrough. A second part 45 of the ring latch includes a threaded hole 46 which is engaged by the bolt 44 to draw the first and second parts 42 and 45 of the ring latch 41 together securely. If desired the ring latch 41 may include interlocking elements 60 and 61 on the first part 42 and second part 45, respectively, for holding the ring latch 42 together until the bolt 44 engages the threaded hold 46. In a preferred embodiment the interlocking elements 60 and 61 will not engage each other if the cover 16 is not properly attached to the housing 14. Failure of the interlocking elements 60 and 61 to engage indicates that further tightening of the cover 16 is required. The threaded hole 46 may be a steel nut molded into the second part of the ring latch to assure the durability of the ring latch 41. This clamping ring is more fully described in U.S. Pat. No. 4,438,960, granted Mar. 27, 1984.

The duct clamping rings 26 which secure the inlet duct 21 and outlet duct 24 to the inlet and outlet duct receptacles 22 and 25, respectively, are identical to the clamping ring 18 except they are somewhat smaller in size.

Referring now to FIG. 5, a collar 47 extends downwardly from the cover 16 to locate the filter element 48 within the housing 14. An O-ring or seal ring 49 may be provided at the top of the collar 47 or on top of the filter element 48 to form a seal between the filter element 48 and the cover 16. This seal is provided to prevent air from circumventing the filter element 48. The resiliency of the seal ring 49 holds the filter 48 against the base plate 19 to form a seal between the filter 48 and the base plate 19.

As shown in FIG. 5, an O-ring 54 is provided on the outlet duct receptacle 25 to seal the connection between the outlet duct receptacle 25 and the outlet duct 24. An extension 55 extends from the outlet duct receptacle 25 into the outlet duct 24. The extension 55 may be received within a tapered recess formed in the outlet duct 24 to allow preassembly of the outlet duct 24 onto the outlet duct receptacle 25. The duct clamping ring 26 is then assembled thereon to securely lock the outlet duct 24 to the outlet duct receptacle 25. A second seal (not shown) may be provided between the outlet duct 24 and the outlet duct receptacle 25, if desired, by adding a seal ring inside the duct clamping ring 26 which is used to secure the outlet duct to the outlet duct receptacle 25.

As shown in FIG. 6, the inlet duct 21 is secured to the inlet duct receptacle 22 by means of the duct sealing ring 26. The seal between the inlet duct 21 and the inlet duct receptacle 22 is provided by means of the seal ring 57 which is fitted within the duct clamping ring 26 just as the ring seal 37 is located within the clamping ring 18. If desired an O-ring (not shown) may be provided as a second seal between the inlet duct 21 and the inlet duct receptacle 22.

The filter element 48 defines an inlet plenum 51 into which the inlet duct 21 discharges air to be filtered. After passing through the filter element 48 air moves into the outlet plenum 52 which in turn supplies air to the outlet duct 24. The inlet and outlet plenums 51, 52 are provided to allow the air to be efficiently filtered because the air is permitted to flow through the entire surface area of filter element 48, which minimizes the airflow restriction caused by the filter. The vacuum created by the engine results in a vacuum throughout the outlet plenum 52 which causes air to be drawn through the filter from the inlet plenum 51.

In operation, air is drawn by the engine through the air cleaner tank 10 from the inlet duct 21, through the filter element 48 to the outlet duct 24. Air leakage between the housing 14 and cover 16 or base plate 19 is prevented by the seals 37 and O-ring 33.

The filter element 48 may be replaced by removing either the cover 16 or base plate 19, depending upon the location in which the tank 10 is mounted on the truck 12. The air filter element can then be replaced and cover 16 or base plate 19 reassembled to the housing 14.

It should be understood that the preceding description is of a single embodiment of the invention and the description is to be read as illustrative and not by way of limitation.

I claim:

1. An air cleaner tank assembly adapted to receive a replaceable air cleaner element, comprising:

a housing having a first open end and a second open end at opposite ends thereof, said housing having said air cleaner element disposed between said first and second open ends, said open ends each being large enough to permit insertion and removal of said air cleaner element therethrough;

first and second removable covers normally closing said first and second open ends, respectively, each of said covers having threaded formations for detachable connection to cooperating threaded formations on said first and second ends of said housing;

said first and second covers each having a radially outwardly extending circumferential flange, and said first and second ends of the housing having a complementary flange adapted to abut said respective cover flanges when said covers and housing have been fully secured;

first and second clamping rings adapted to engage, lock together and secure against relative rotation said complementary flanges at said first and second ends of said housing, respectively;

said first cover having first attaching means formed thereon for receiving and attaching a first air duct, thereby to establish a first air flow path through said first cover and between the interior of said housing and said first air duct; and a third opening formed in a side wall of said housing between said first and second open ends, attaching means formed on said housing at said third opening for receiving and attaching a second air duct, thereby to establish a second air flow path through said third opening and between the interior of said housing and said housing and said second air duct.

2. The air cleaner tank assembly of claim 1 wherein said clamping rings are dimensioned and configured to cooperate with said flanges so that each clamping ring is incapable of being secured to its associated flanges unless the associated cover and housing have been properly and fully threaded together.

3. The air cleaner tank assembly of claim 1 which further comprises annular resilient compressible seals disposed between each of said covers and said housing to establish a seal therebetween when compressed between opposed surfaces of the secured covers and housing.

4. The air cleaner tank assembly of claim 1 wherein said housing, covers and clamping ring are all molded members formed of high strength plastic.

* * * * *